(12) United States Patent
Wall et al.

(10) Patent No.: US 6,473,398 B1
(45) Date of Patent: Oct. 29, 2002

(54) CONGESTION MANAGEMENT IN MANAGED PACKET-SWITCHED NETWORKS

(75) Inventors: Wayne Wall, Kanata (CA); Micaela Giuhat, Nepean (CA); Johanne Mayer, Ottawa (CA); Felix Katz, Nepean (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/142,475
(22) PCT Filed: Mar. 17, 1997
(86) PCT No.: PCT/CA97/00183
  § 371 (c)(1),
  (2), (4) Date: Jun. 30, 1999
(87) PCT Pub. No.: WO97/35409
  PCT Pub. Date: Sep. 25, 1997

(30) Foreign Application Priority Data

Mar. 15, 1996 (GB) .............................................. 9605425

(51) Int. Cl.[7] .............................................. H04L 12/56
(52) U.S. Cl. ..................................... 370/229; 370/395.1
(58) Field of Search ................................ 370/229, 429, 370/503, 389, 395, 351, 352, 330, 331, 462, 461, 400, 216, 230, 231, 232, 233, 234, 235, 236, 237, 240, 254, 252, 247, 411, 395.1, 468, 447

(56) References Cited

U.S. PATENT DOCUMENTS

| 4,475,192 | A | * | 10/1984 | Fernow et al. | 370/232 |
| 5,014,265 | A | * | 5/1991 | Hahne et al. | 370/468 |
| 5,067,127 | A | * | 11/1991 | Ochiai | 370/238 |
| 5,357,510 | A | * | 10/1994 | Norizuki et al. | 370/236 |
| 5,457,687 | A | * | 10/1995 | Newman | 370/232 |
| 5,663,948 | A | * | 9/1997 | Kobunaya | 370/429 |

FOREIGN PATENT DOCUMENTS

EP   WO 97/35409   *   9/1997

OTHER PUBLICATIONS

"Congestion control in Frame Relay Networks Using Explicit Binary Feedback", Goldstein, pp. 558–564, 1991.*
"ATM System Architecture for Seamless Network Evolution", Endo et al., pp. 1839–1843, 1993.*

* cited by examiner

Primary Examiner—Dang Ton
(74) Attorney, Agent, or Firm—Marks & Clerk

(57) ABSTRACT

A packet switched network includes a network manager for managing resources on the network and a plurality of switch nodes. A congestion indicator threshold is (Cir) for each resource at each switch node and congestion event indicator is forwarded to the network manager immediately upon the congestion level of a monitored resource exceeding its congestion threshold. A congestion status for the monitored resources of each switch node is maintained by the network manager.

7 Claims, 3 Drawing Sheets

CONGESTION MANAGEMENT IN MANAGED PACKET-SWITCHED NETWORKS

This invention relates to congestion management in managed packet-switched networks, such as frame relay networks, and encompasses both the real-time aspects of congestion control and avoidance, and Operations, Administrations and Maintenance procedures to detect the onset of congestion.

Congestion management for frame relay switched networks, which are designed to handle bursty traffic, is an important issue due to the possibility that frame relay resources will become depleted, causing congestion. In this case congestion management includes real-time mechanisms to prevent or recover from congestion, as well as procedures to detect the onset of congestion.

Congestion management procedures have several important requirements. The number of frame discards and level of degradation of service to user devices during congestion must be minimized. They must simple to implement and place little overhead upon the network, be fair in allocating resources among competing PVCs, limit the spread of congestion to other network elements, and optimize the use of network resources. The configuration complexity should be minimized, yet flexible enough to allow tuning of the network congestion procedures. Discard frames with the Discard Eligibility bit (DE) set should be discarded in preference to other frames during a congestion situation. Facilities that notify severely congested circuits should be provided and they should provide sufficient information so that network operators can isolate the source of congestion.

Existing practice as implemented, for example, on the Newbridge Networks Corporation MainStreet product line uses several mechanisms shown in FIG. 1. These include negotiating a minimum bandwidth (CIR) among other class of service parameters for each PVC; and monitoring the actual bandwidth utilization at ingress, which involves policing the incoming information rate and marking traffic which exceeds CIR in support of two levels of priority and fairness; monitoring the depletion of network resources; initiating standards-based implicit congestion mechanisms, also referred to as congestion avoidance procedures, during times of low levels of congestion; and turning to standards-based explicit congestion mechanisms to efficiently and effectively recover from congestion during times of high levels of congestion.

The above mechanisms generate congestion alarms to reflect the severe, mild and non-congestion state that can exist within a frame, stream and/or the whole card. Alarms are generated and logged to the Newbridge Networks Corporation 46020 network management system if the circuit/card enters the RED congested state. These indicators are debounced by a low passing filter to manage the transition between the states as shown in FIG. 2.

Because of the low pass filter implementation, spikes shown in FIG. 2 are not accounted for when generating the alarm. This causes loss of frames without an actual indicator of this happening. For a congestion alarm to be raised, the frame stream buffer must be over the Severe Congestion Threshold (SCT) for five continuous seconds. If the buffer utilization dips below SCT the counter is reset to zero regardless of the time spent in the SCT range. When in Severe Congestion it is referred to as being in the RED state. The following statistics are also subject to the five second filter: Number of RED alarms, Percentage of time spent in RED state, Duration of longest RED state.

The RED state is significant because in this state Frames with the DE bit set are discarded. The discarding of flames is not subject to the five second delay. There are therefore two definitions of the RED state, one for statistics and alarms (five second delay) and one for discards (instantaneous).

For a traffic pattern shown in FIG. 3, the system is in the discarding RED State for 98% of the time (4.9s/5.0s). However the statistical and alarming RED state was never reached. Therefore no alarms are raised and there is no indication that a RED state has been entered, while significant frames have been discarded without any operator alert.

At first glance, the traffic profile in FIG. 3 may seem very improbable, and unrealistic. In actual practice a similar profile with identical characteristics and the resulting discards and alarms is very common. It is actually the intentional result of the frame relay congestion avoidance scheme.

The traffic profile in FIG. 4 is a profile that results from the existing frame relay congestion avoidance scheme. When the switch buffers reach the SCT level, all the frames with DE set are discarded. This results in the buffer utilization dropping instantly below the threshold. The buffer then fills up again with the same result. While less time is spent in the discarding RED state than in FIG. 3, there are still a significant number of of frames (all frames with DE set at the time the threshold is exceeded) discarded without any alarms or statistics to reflect the reason for their being discarded.

The actual amount of frames discarded will be a function of the number of frames that have DE set. The more frames with DE set, the more discards that will occur. This is shown in FIG. 5.

The number of frames with DE set (if all setting is done by Newbridge Networks Corporation FREs/FRSs [Frame Relay Engines and Frame Relay Switches) and not the end devices] will be determined by how "tightly" the network is engineered. In a "loosely" engineered network, where the Class of Service (COS) parameters CIR, Bc and Be are significantly greater than the actual traffic, there will not be many DE bits set since CIR and Bc are rarely exceeded. Since relatively few frames are discarded, the buffer may not fall below the SCT threshold, the five second window will expire, and the alarms will be raised and the statistics collected.

In a tightly engineered network where the COS parameters accurately reflect the traffic profiles, there may be many DE bits set. Since many frames may be discarded, the buffer may always fall below the SCT level resetting the five second counter. Therefore the tightly engineered network may discard more frames (more frames with DE set) and never get any alarms.

According to the present invention there is provided a method of managing a packet switched network comprising a plurality of switch nodes and a network manager and wherein packets are discarded in the event of congestion in the network. A congestion event indicator is notified to the network manager immediately whenever the congestion level of a resource in a switch node in the network exceeds a congestion threshold, and the network manager maintains a congestion status for the switch node based on the receipt of said congestion event indicators.

The invention addresses the network requirements with regards to the enhanced frame relay network congestion indicators. These indicators can be monitored by a network management entity in the generation of trouble tickets.

The frame relay engine supports a mechanism for notifying congestion and the occurrence of frame discards on the switch. When the switch buffer usage or a frame Networks Corporation 46020 will be notified. CPU congestion will not cause a 'Congestion Indication' to be sent to the network manager.

Preferably, a single congestion indicator event will be sent to the network manager when a resource on the switch exceeds a Congestion Indicator Threshold (CIT). The Congestion Indicator Threshold can be set equal to ACT, SCT or MCT for each resource on the switch. Whenever a frame is to be placed in a resource (e.g. transmit queue for a frame stream) that has reached or exceeded the Congestion Indicator Threshold then the resource is declared as congested. The Congestion Indicator status is updated to indicate that the switch has a congested resource, and an event is sent to the network manager. The status of the Congestion Indicator is changed to 'No Congestion' only if the level of congestion of all resources on the switch remain below the 'Congestion Indicator Threshold' for a period of a user configurable 'Congestion Indicator Clear Time'.

The invention will now be described in more detail, by way of example, only with reference to the accompanying drawings, in which.

Figure 1:
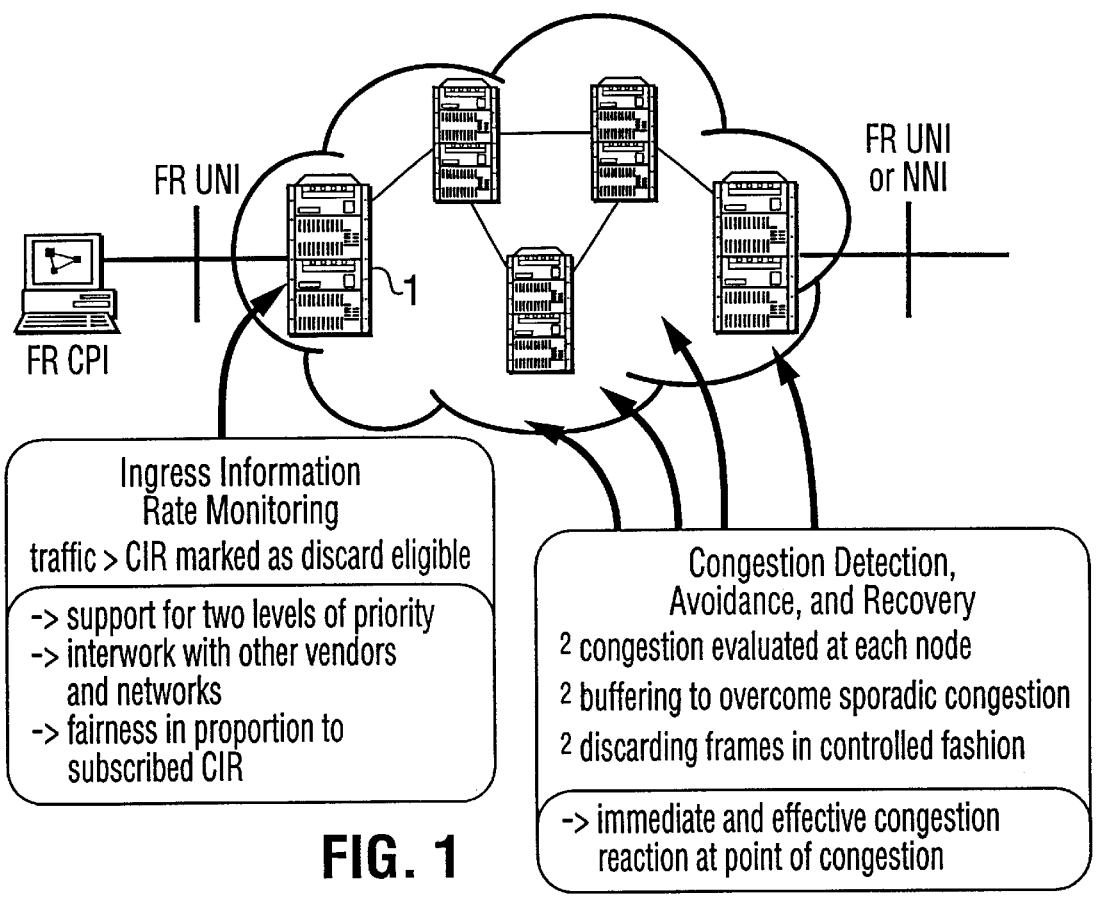
FIG. 1 shows a Newbridge Frame Relay Congestion Management Model.
Figure 2:
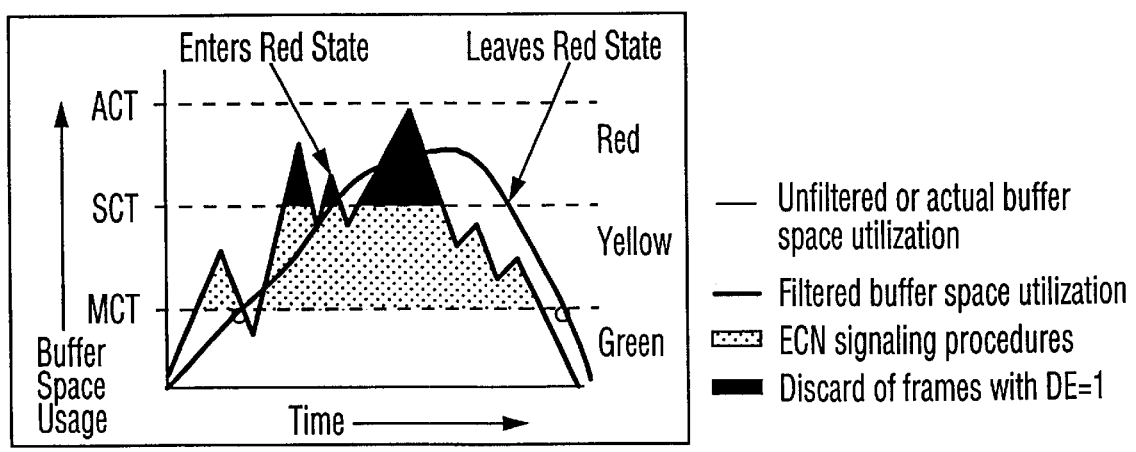
FIG. 2 shows Congestion Status Thresholds.
Figure 3:
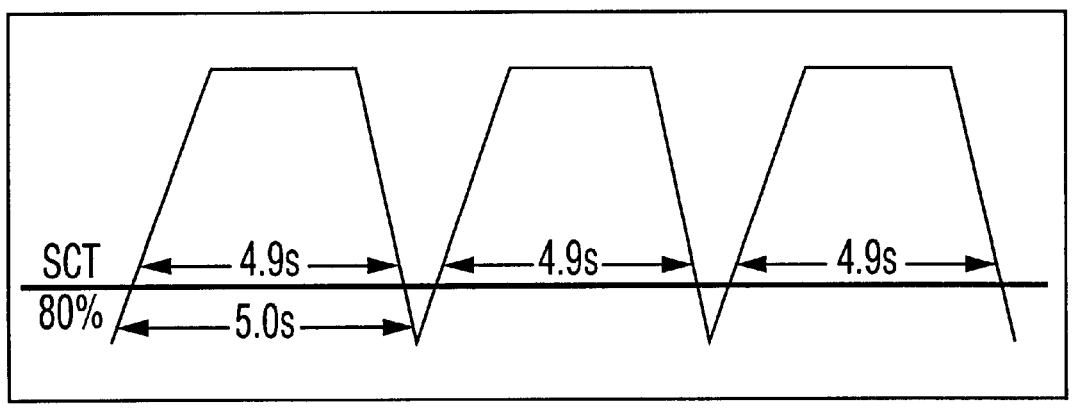
FIG. 3 is one example Traffic Profile.
Figure 4:
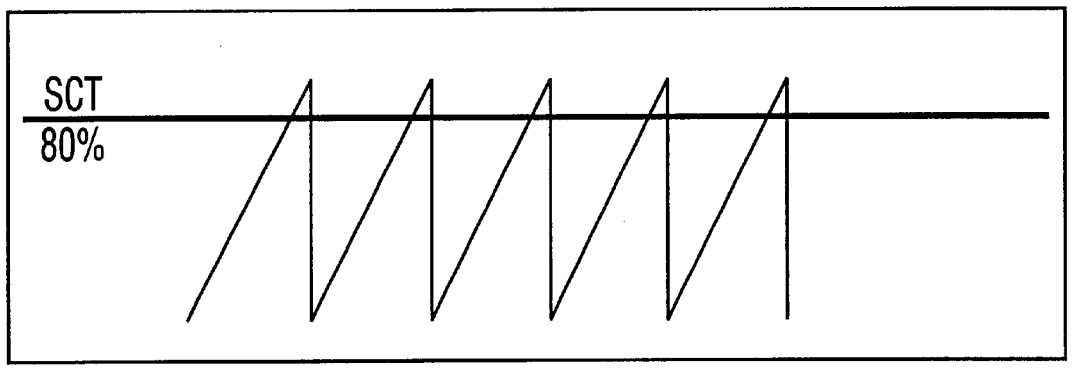
FIG. 4 is another Example Traffic Profile.
Figure 5:
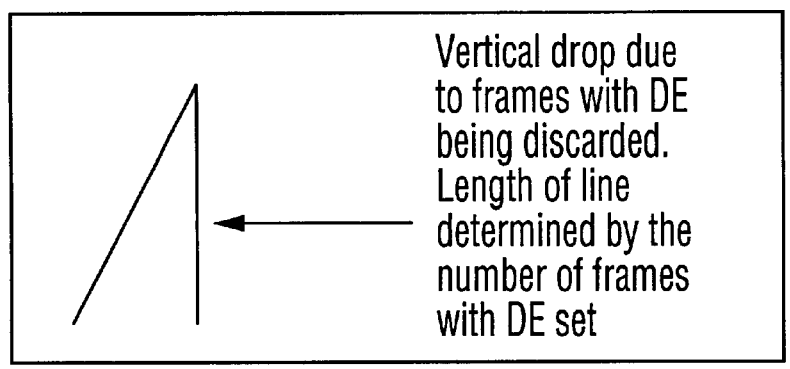
FIG. 5 shows the Frame Discard Level Dependancy on # Frames with DE Bit Set.
Figure 6:
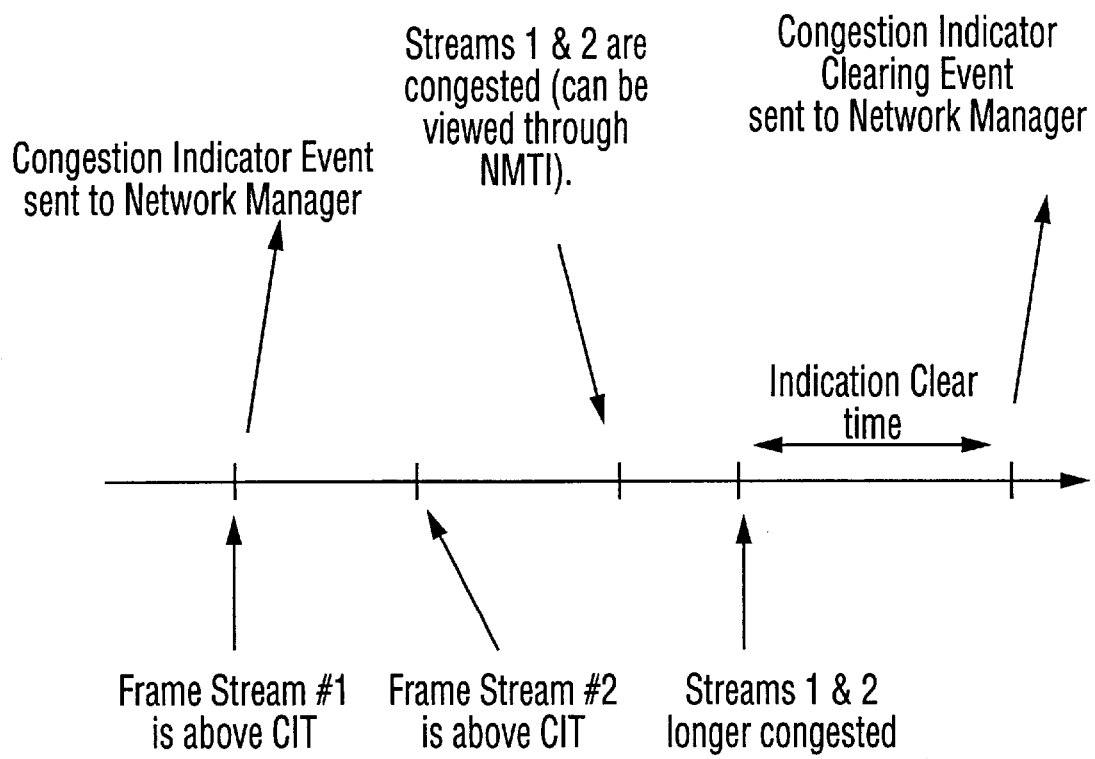
FIG. 6 is an Example Congestion Indicator Event Notification in accordance with the invention.

Referring now to the example shown in FIG. 6, the congestion level of frame stream #1 goes above the Congestion Indication Threshold (CIT) on the switch. A Congestion Indication event is immediately sent to the network manager. Shortly afterwards the congestion level of frame stream #2 goes above the CIT. Both streams 1&2 will be indicated as congested by the NMTI Node Management Terminal Interface interface.

When the congestion level of all resources on the switch (in our example stream 1&2) drops below the CIT for a user configurable Congestion Indicator Clear Time, a Clear Congestion Indicator event is sent to the network manager clearing the switch congestion.

An option is available to turn off this congestion indication reporting mechanism. As well, the user is able to clear the historical record of the peak level of congestion of the resources.

This feature has no anticipated impact on the traffic flow, when the network includes nodes do not support this feature. The information in this case could be retrieved by using other tools (stats).

The frame relay network supports a mechanism for notifying the manager of frame discards due to congestion. If congestion event reporting is "on", this information will be used by the network manager to raise trouble tickets when frames are discarded due to congestion in the network. An option will be available to turn "off" this congestion event reporting mechanism, with the default being "off".

A single congestion indicator event will be sent to the network manager when a resource (stream or switch) on the switch exceeds a Congestion Indicator Threshold (CIT). The user can tune the sensitivity and duration of the congestion reporting mechanism by adjusting the Congestion Indicator Threshold and the congestion indicator clearing time. The user can also adjust the ACT (Absolute Congestion Threshold) excluding switch level, SCT and MCT (mild Congestion Threshold) thresholds for each resource on the card.

The user will be able to set the following options on a per switch level basis to tune the reporting mechanism:

| Parameter | Default | Description |
| --- | --- | --- |
| Congestion Indicator Clear Time | 15 Minutes | 1 Minute.. 24 Hours |
| Congestion Indicator Threshold | SCT | MCT, SCT, ACT |
| Congestion Event Reporting | Off | On, Off |

The network manager can be used to read the status of each resource on the switch or the record of the peak level of congestion for each resource since the last reset by the user.

The network manager can also 'highlight' congestion status (using a mechanism other than trouble ticket) based on a switch congestion level, or actual resource congestion levels.

Currently, this invention can be implemented on any system that has to indicate the status of a resource or device to a central management station, particularly, where the resource status changes frequently, and there is a requirement that the central management station not be over burdened with status change indications from the network.

This invention is directly applicable to LAN or Frame relay switching equipment that is controlled and monitored from a central network management station. Resources on the frame relay switch can enter and exit the congested state frequently. This information needs to be visible from the network station and must represent the peak resource congestion levels experienced by the frame relay traffic.

What is claimed is:

1. A method of managing a packet switched network comprising a network manager for managing resources on the network, and a plurality of switch nodes, each said switch node having resources to be monitored and being in communication with said network manager, and wherein packets passing through said switch nodes are discarded in the event of congestion, comprising the steps of:

setting a congestion indicator threshold (CIT) for each said resource at each switch node, said congestion indicator threshold representing a predetermined level of congestion;

forwarding a congestion event indicator to said network manager immediately in response to the congestion level of a monitored resource exceeding the congestion threshold set therefor; and maintaining at the network manager a congestion status for the monitored resources of each switch node in response the receipt at said network manager of said congestion event indicators.

2. A method as claimed in claim 1, wherein said congestion indicator threshold is user-configurable.

3. A method as claimed in claim 2, wherein when the congestion level of all the resources drops below said congestion threshold for a predetermined period of time, a clear congestion indicator event is sent to said network manager to clear said congestion status.

4. A method as claimed in claim 3, wherein said predetermined period of time is user-configurable.

5. A method as claimed in claim 1, wherein the network manager is notified of packet discards due to congestion.

6. A method as claimed in claim 5, wherein said network manager raises trouble tickets in response to being notified of packet discards.

7. A method as claimed in any one of claims 1 to 6, wherein said packet switched network is a frame relay network.

* * * * *